(12) United States Patent
Phyall et al.

(10) Patent No.: US 12,703,285 B2
(45) Date of Patent: Aug. 11, 2026

(54) VEHICLE CENTRE CONSOLE TABLE SYSTEM

(71) Applicant: JAGUAR LAND ROVER LIMITED, Whitley (GB)

(72) Inventors: Ben Phyall, Whitley (GB); Spencer Greening, Whitley (GB); Luke Tighe, Whitley (GB); Alexander Gray, Whitley (GB); Brett Townsend, Whitley (GB); John Heath, Whitley (GB); Henry Vyskocil, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 138 days.

(21) Appl. No.: 18/702,768

(22) PCT Filed: Oct. 10, 2022

(86) PCT No.: PCT/EP2022/078131
§ 371 (c)(1),
(2) Date: Apr. 18, 2024

(87) PCT Pub. No.: WO2023/066704
PCT Pub. Date: Apr. 27, 2023

(65) Prior Publication Data

US 2025/0229690 A1 Jul. 17, 2025

(30) Foreign Application Priority Data

Oct. 22, 2021 (GB) ...................................... 2115171

(51) Int. Cl.

| | |
|---|---|
| ***B60N 3/00*** | (2006.01) |
| ***A47B 1/03*** | (2006.01) |
| ***B60R 7/04*** | (2006.01) |

(52) U.S. Cl.
CPC ................ *B60N 3/001* (2013.01); *A47B 1/03* (2013.01); *B60R 7/04* (2013.01); *A47B 2001/035* (2013.01)

(58) Field of Classification Search
CPC ....... A47B 1/03; A47B 2001/035; B60R 7/04; B60N 3/001
See application file for complete search history.

(56) References Cited

U.S. PATENT DOCUMENTS

| | | | |
|---|---|---|---|
| 3,632,161 | A | 1/1972 | Arfaras et al. |
| 6,032,587 | A | 3/2000 | Salenbauch et al. |

(Continued)

FOREIGN PATENT DOCUMENTS

| | | | |
|---|---|---|---|
| CN | 104228644 | B | 10/2016 |
| DE | 102015226812 | A1 | 12/2016 |

(Continued)

OTHER PUBLICATIONS

Great Britain Intellectual Property Office, Search Report under Section 17 Issued in Application No. GB2115171.7, Apr. 19, 2022, 4 pages.

(Continued)

*Primary Examiner* — Matthew W Ing
(74) *Attorney, Agent, or Firm* — McCoy Russell LLP

(57) ABSTRACT

A vehicle centre console table system includes: a table; an actuation system configured to, based on an electrical signal, elevate the table from a first position to a second position above the first position, wherein in the first position the table is in a substantially horizontal orientation and defines a vehicle centre console surface, and wherein in the elevated second position the table is in the substantially horizontal (Continued)

orientation; a slider configured to enable horizontal sliding of the table from the second position to an aft position rearward of the second position; and a pivot proximal to a fore end of the table, configured to enable turning of the table along a horizontal arc, in clockwise and anti-clockwise directions, between a first operating angle to a first side −y of the aft position and a second operating angle to a second opposite side +y of the aft position.

16 Claims, 7 Drawing Sheets

(56) References Cited

U.S. PATENT DOCUMENTS 6,220,660 B1 * 4/2001 Bedro ...................... B60N 2/79 297/146
9,896,011 B2 2/2018 Kong et al.
2009/0058152 A1 3/2009 Orlo et al.
2016/0272120 A1 9/2016 Johnston et al.
2016/0375810 A1 * 12/2016 Kong ..................... B60N 2/793 297/145
2019/0031114 A1 1/2019 Line et al.
2019/0315259 A1 10/2019 Lee et al.

FOREIGN PATENT DOCUMENTS

GB 2552393 A 1/2018
WO 0047442 A1 8/2000
WO 2018188435 A1 10/2018

OTHER PUBLICATIONS

ISA European Patent Office, International Search Report and Written Opinion Issued in Application No. PCT/EP2022/078131, Mar. 6, 2023, WIPO, 13 pages.

* cited by examiner

VEHICLE CENTRE CONSOLE TABLE SYSTEM

CROSS REFERENCE TO RELATED APPLICATIONS

The present application is a U.S. National Phase of International Application No. PCT/EP2022/078131 entitled "VEHICLE CENTRE CONSOLE TABLE SYSTEM," and filed on Oct. 10, 2022. International Application No. PCT/EP2022/078131 claims priority to Great Britain Patent Application No. 2115171.7 filed on Oct. 22, 2021. The entire contents of each of the above-listed applications are hereby incorporated by reference for all purposes.

TECHNICAL FIELD

The present disclosure relates to a vehicle centre console table system. In particular, but not exclusively it relates to a vehicle centre console table system for a vehicle rear centre console, and relates to a vehicle rear centre console, and relates to a vehicle.

BACKGROUND

It is known for vehicles comprising multiple rows of seats to comprise seat back-mounted tables for rear seat occupants. A limitation of seat back-mounted tables is that the front seat supporting the table is slidable backwards and forwards, resulting in undesirable movement of the table for the rear-seated occupant.

A table supported at another, fixed location in the vehicle may require multiple different joints to enable the table to be positioned in front of the user. The joints may enable the table to pivot about at least two different axes. Each joint may have a degree of lost motion associated therewith. The table and its mechanisms also require a large volume of packaging space.

SUMMARY OF THE INVENTION

It is an aim of the present invention to address one or more of the disadvantages associated with the prior art.

Aspects and embodiments of the invention provide a vehicle centre console table system, a vehicle centre console, a vehicle, etc., as claimed in the appended claims.

According to an aspect of the invention there is provided a vehicle centre console table system

- for a vehicle, the vehicle centre console table system comprising:
- a table;
- an actuation system configured to, in dependence on an electrical signal, elevate the table from a first position to a second position above the first position, wherein in the first position the table is in a substantially horizontal orientation and defines a vehicle centre console surface, and wherein in the elevated second position the table is in the substantially horizontal orientation;
- a slider configured to enable horizontal sliding of the table from the second position to an aft position rearward of the second position; and
- a pivot proximal to a fore end of the table, configured to enable turning of the table along a horizontal arc, in clockwise and anti-clockwise directions, between a first operating angle to a first side of the aft position and a second operating angle to a second opposite side of the aft position.

An advantage is better use of packaging space of the vehicle. This is because the ability to deploy the table rearwards and then reposition the table enables the table to be stowed at a forward position along the vehicle centre console, without the possibility of interference between the table and objects (e.g., backs of the front seats). This forward stowing position of the table enables other equipment to be located aft of the stowed table within convenient reach of rear seat occupants.

The vehicle centre console table system may comprise a support coupling the table to a lower portion, wherein the actuation system may be configured to elevate the combination of the lower portion, the support, and the table. The support may be a fixed-length support. The support may comprise a hollow structural section. The support may be configured to inhibit rotation of the table away from the substantially horizontal orientation.

An advantage is optimisation of several factors, including packaging space and access to the lower portion and stability/rigidity of the table. This is because the space (lower portion) under the table may be usable to store personal items, because the lower portion is elevated for enabling convenient access to personal items, and because the support is structural and has a fixed length and supports the table in a fixed horizontal plane.

As mentioned above, the lower portion may comprise a stowage portion, wherein the stowage portion may be concealed from a cabin of the vehicle when the table is in the first position. The stowage portion may be a stowage platform, In some examples the table, at the first position, is at a flush position relative to a first plane of a table system opening of a vehicle centre console and the stowage platform is enclosed beneath the table, and when the table is at the second position an upper edge of the stowage platform is substantially at the flush position.

An advantage is improved ergonomics because for any given state of the vehicle centre console table system, the table system opening is filled either by the table or by the lower portion.

A base of the support may be located fore of the stowage portion, and the support may be angled in an aft direction towards the table.

An advantage is improved use of packaging space because the support does not obstruct the stowage platform.

The slider may comprise a detent at the aft position. The pivot may comprise a first detent corresponding to the first operating angle of the table and the pivot may comprise a second detent corresponding to the second operating angle of the table.

An advantage is improved stability/rigidity of the table.

The aft position may be a central position along the arc, such that the table can be turned via the pivot to either side of a longitudinal axis to face different seats in a row of seats. An angular separation between the first operating angle and the aft position may be a value less than 70 degrees, and an angular separation between the second operating angle and the aft position may be a value less than 70 degrees.

An advantage is improved use of packaging space and weight/part count compared to providing independent tables for left and right seats. An advantage of restricting the turning of the table to a value less than 90 degrees is preventing interference with other objects (e.g., backs of the front seats).

The table may comprise deployable leaves configured to, when deployed, increase a surface area of the table.

An advantage is improved use of packaging space because the table can be stowed in the narrow vehicle centre console while still being usable as a narrow table. When deployed, the table can be widened via the leaves.

The vehicle centre console table system may comprise a control system configured to control the actuation system in dependence on the electrical signal. The vehicle centre console table system may comprise a slider sensor configured to indicate a state of the slider. The vehicle centre console table system may comprise a pivot sensor configured to indicate a state of the pivot. The control system may be configured to, during lowering of the table from the second position to the first position, detect an interference against moving the table to the first position, and to interrupt the lowering of the table in response to the detection.

An advantage is automation of at least part of table deployment/stowing, and enabling the detection and avoidance of interference situations where the table system may interfere with another object during its movement.

For example, the control system may be configured to control whether to enable the table to lower from the second position to the first position, in dependence on information from the slider sensor, so that the retraction is not enabled if the table is away from the second position.

The control system may be configured to control a rearward adjustment limit of a seat of the vehicle, the seat located fore of the vehicle centre console table system, in dependence on information from the pivot sensor, wherein the rearward adjustment limit is reduced if the pivot sensor indicates that the table is in a turned state.

According to an aspect of the invention there is provided a vehicle centre console comprising the vehicle centre console table system.

In some examples, the table at the first position is at a substantially flush position relative to a first plane of the vehicle centre console, and wherein the table at the second position may be above the first plane of the vehicle centre console. The first plane may be a top plane (top A-surface) of the vehicle centre console.

The stowage platform may be enclosed within the vehicle rear centre console when the table is at the first position. An advantage is improved security as well as improved use of packaging space.

The vehicle centre console may comprise a user input device section located aft of the vehicle centre console table system, closer to a seat row than the vehicle centre console table system, the seat row being behind another seat row of the vehicle. The user input device section may enable a user to request movement of the table by the actuation system.

According to an aspect of the invention there is provided a vehicle comprising the vehicle centre console table system or the vehicle centre console.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
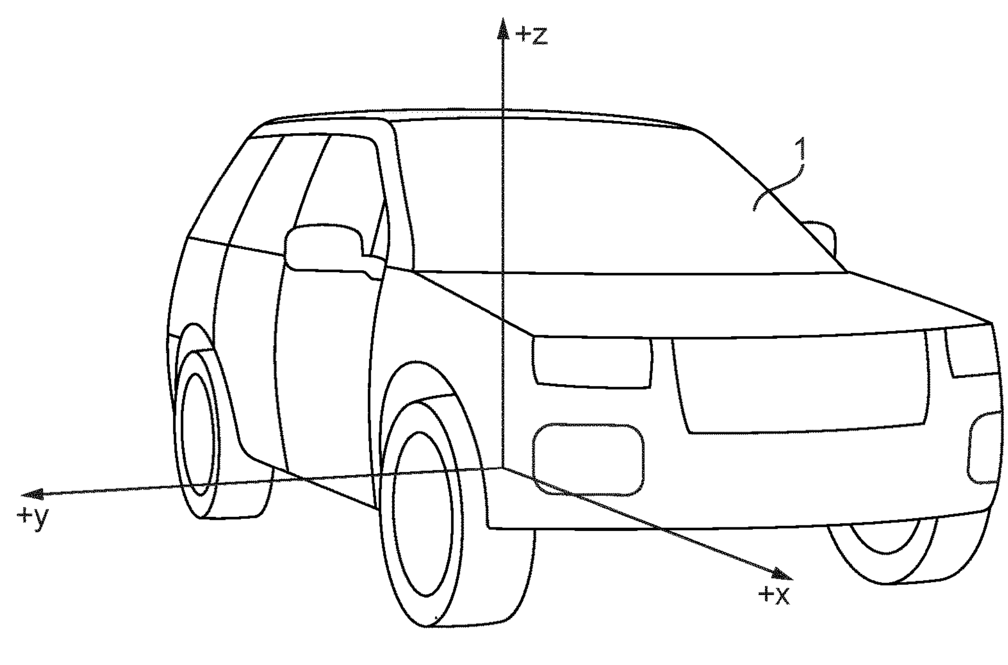
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

FIG. 1 is a front perspective view and illustrates a longitudinal x-axis between the front and rear of the vehicle 1 representing a centreline, an orthogonal lateral y-axis between left and right lateral sides of the vehicle 1, and a vertical z-axis. A forward/fore direction typically faced by a driver's seat is in the positive x-direction; rearward/aft is −x. A rightward direction as seen from the driver's seat is in the positive y-direction; leftward is −y. These are a first lateral direction and a second lateral direction. Any references herein to an object extending in a particular axis refers to a direction and does not limit the position of the object within the vehicle 1.

Figure 2:
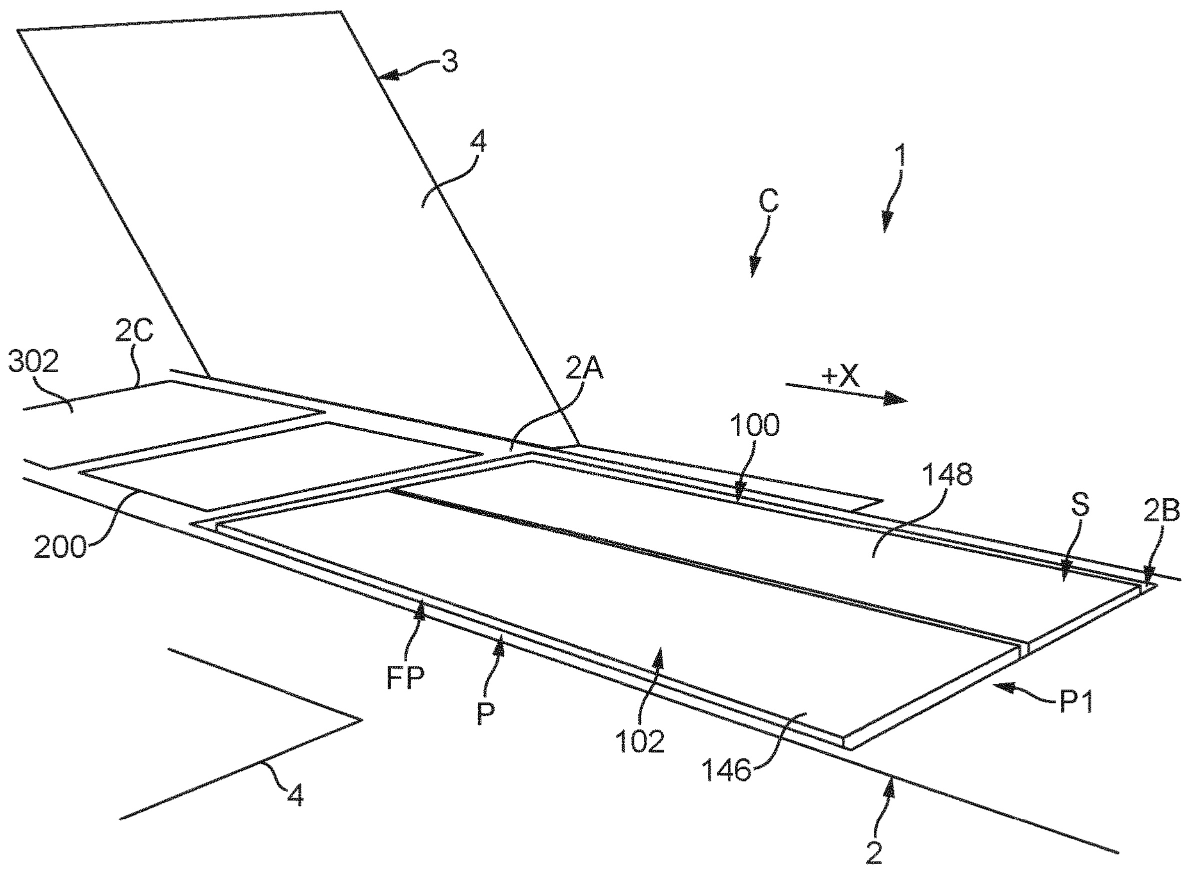
FIG. 2 illustrates an example of a vehicle centre console table system comprising a table at a first position.

FIG. 2 schematically illustrates an example of a vehicle centre console 2 in front perspective view. The vehicle centre console 2 can be located between seats 4 in a row 3 of seats 4 of the vehicle 1. The vehicle centre console 2 may extend along the x-axis. The vehicle centre console 2 may extend along a centreline of the vehicle 1.

In some examples, the row 3 of seats 4 is other than a front row of seats of the vehicle 1 comprising a driver's seat. The row 3 of seats 4 may be aft of another row of seats of the vehicle 1. For example, the row 3 of seats 4 may comprise a first rear row of seats 4 or (if present) a second rear row of seats 4. Optionally, the vehicle centre console 2 extends between the seats 4 in lieu of a centre seat.

The vehicle centre console 2 comprises various accessories for the convenience of occupants of those seats 4. An upper surface of the vehicle centre console 2 can comprise sections (e.g., openings) for receiving the various accessories during assembly. The vehicle centre console 2 can comprise a table system section/opening 2B for the installation of a vehicle centre console table system 100 ('table system' herein). In some examples, the vehicle centre console 2 can further comprise a user input device section/opening 2C for the installation of a user input device 302 such as a touchscreen display. The user input device 302 may be located aft of the table system 100 and opening 2B, as shown in FIG. 2, so is convenient to reach from the seats 4. In some examples, the vehicle centre console 2 can further comprise a cupholder system 200. The cupholder system 200 may be located aft of the table system 100 and opening 2B.

The features of the table system 100 will now be described. FIGS. 2-7 illustrate the table system 100. The table system 100 comprises a movable apparatus comprising a table 102 movable from a first position P1 (stowed, retracted position) to a second position P2 (deployed position) elevated above the first position P1. The table 102 can then be reconfigured via one or more movable table joints. The table 102 can be slid from the second position P2 to an aft position AP rearward of the second position P2. The table 102 can then be turned from the aft position AP to another horizontal angle if desired by the user. The table 102 is pivotable horizontally from the aft position AP, between a first operating angle A1 facing a left seat 4 and a second operating angle A2 facing a right seat 4. Deployable leaves 146, 148 of the table 102 can be opened out.

Figure 12:
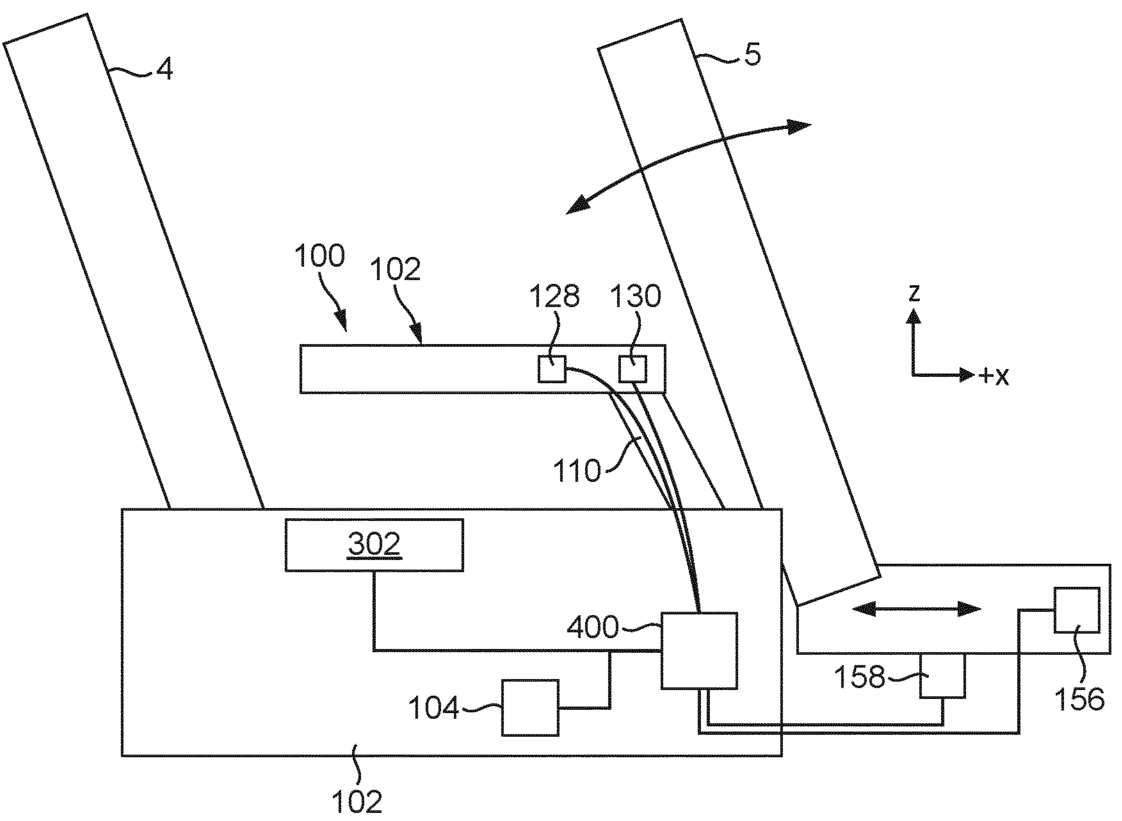
FIG. 12 schematically illustrates an example of a control system, sensors, actuators and user input devices.

An advantage of the ability to deploy the table 102 rearwards and then reposition the table 102 is that the table 102 can be stowed in a relatively forward position on the vehicle centre console 2, without the possibility of interference between the table 102 and front seats 5 (FIG. 12). This enables other equipment such as the user input device 302 and cupholder system 200 to be located aft of the stowed table 102 within convenient reach of the seat occupants.

FIG. 2 illustrates the table 102 in the first position P1. The first position P1 is a stowed position of the table 102. In the first position P1, the table 102 is in a substantially horizontal orientation. The table 102 is usable by occupants of the row 3 of seats 4. Occupants can lean forward and place items on a surface of the table 102.

In the illustrated example, the surface of the table 102 is at a flush position FP relative to the vehicle centre console 2. Therefore, the surface of the table 102 functions as a vehicle centre console surface S. The flush position FP occupies part of a larger first plane P of the vehicle centre console 2. The first plane P may be a substantially horizontal plane. That is, a substantial part of the vehicle centre console 2, and not just the table 102, may provide a planar substantially horizontal surface. The first plane P may be defined by the table system opening 2B of the vehicle centre console S.

Referring to FIG. 2, the first plane P may be a plane on which a touchscreen surface of the user input device 302 is located. The first plane P may be a plane on which upper peripheral edges 2A of the vehicle centre console 2, at the edges of the openings 2B, 2C, are located. The first plane P may be a plane on which a closed lid of the cupholder system 200 is located.

Further, the area and dimensions of the table 102 may be configured so that edges of the table 102 meet the corresponding upper peripheral edges 2A of the vehicle centre console 2 with minimal gaps therebetween.

The flush position FP of the table 102 ensures a smooth finish with minimal gaps or discontinuities between the neighbouring accessories. The terms 'flush finish' and 'minimal gaps' relates to a degree of tolerance understood by the engineer skilled in the art. The planar arrangement of the parts (2A, 302, 102) defining the upper exterior surface of the vehicle centre console 2, with minimal gaps, provides a surface that is aesthetic and ergonomic, easily cleanable and resistant to ingress of fluid or small objects through gaps.

In the example illustrated in the Figures, the table 102 comprises a table body 144 (main body, visible in FIG. 3) and deployable leaves 146, 148 (secondary bodies) to increase a surface area of the table 102 when deployed to an open configuration. The deployable leaves 146, 148 may be deployable to increase a width (y-axis) of the table 102 when deployed. This is desirable because the table body 144 may have a width less than its length (x-axis), to fit within the narrower vehicle centre console 2. When the deployable leaves 146, 148 are in the deployed configuration, the width of the table 102 (including body and leaves 144, 146, 148) is greater than the width of the vehicle centre console 2. It would be appreciated that in other examples, the table 102 can comprise a single table body 144 without deployable leaves 146, 148.

The illustrated deployable leaves 146, 148 comprise a first leaf 146 connected to a first side of the table body 144, and a second leaf 148 connected to a second, opposite side of the table body 144. When the table 102 is in the first position P1, the deployable leaves 146, 148 are in a closed, folded configuration so that the plan view width of the table 102 is less than the plan view width of the vehicle centre console 2.

Figure 11:
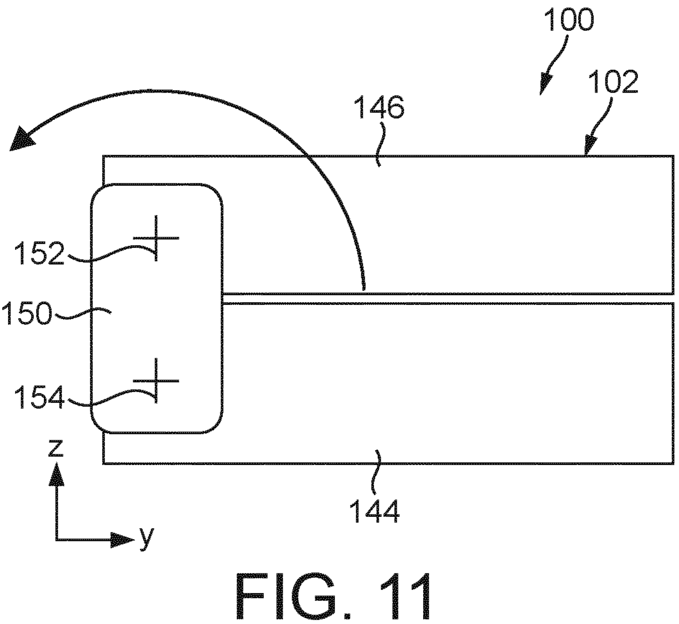
FIG. 11 schematically illustrates an example of a hinge for a table leaf.

The deployable leaves 146, 148 may be hinged such that the deployable leaves 146, 148 are folded on top of the table body 144 when in the closed configuration. An example double hinge 150 for a leaf 146, 148 is shown in FIG. 11. The double hinge 150 comprises a first hinge axis 152 and a second hinge axis 154 parallel to the first hinge axis 152. The double hinge 150 may comprise a hinge block through which the first and second hinge axes 152, 154 extend. It would be appreciated that the deployable leaves 146, 148 could be deployable in a different manner than that shown.

In FIG. 2, the deployable leaves 146, 148 are in the closed configuration and the table 102 is in the first position P1. The hinged deployable leaves 146, 148 are upside down in the closed position, so their undersides face upwards and are substantially horizontal so that items can be placed thereon. The upwardly-facing undersides of the deployable leaves 146, 148 are at the flush position FP on the first plane P. The table body 144 may be concealed beneath the deployable leaves 146, 148.

The average width of each leaf 146, 148 may be approximately half the width of the table body 144, so that when the deployable leaves 146, 148 are folded closed the first and second leaves 146, 148 meet at a central border/gap. The sum of the plan view areas of the deployable leaves 146, 148 may be approximately equal to the plan view area of the table body 144.

Figure 3:
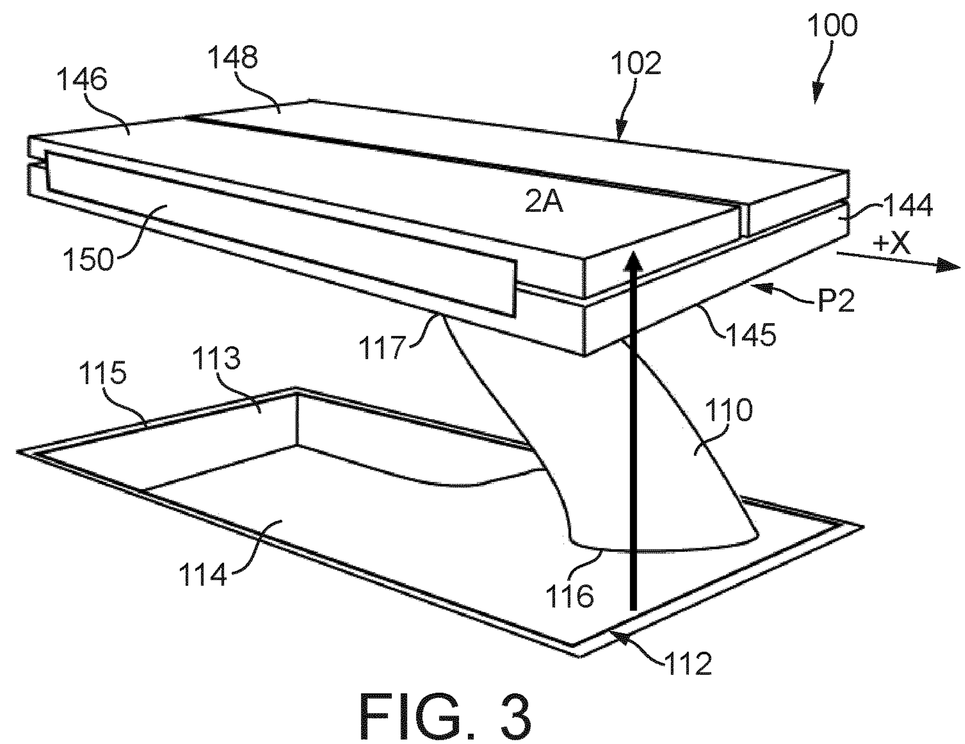
FIG. 3 illustrates an example in which the table has been raised to a second position.

FIG. 3 illustrates the table 102 at a second position P2 elevated above the first position P1. The vertical distance between the second position P2 and the first position P1 may be a value selected from the range 10 centimetres to 40 centimetres. In some examples, an offset between the first position P1 and the second position P2 consists of a substantially vertical offset without a lateral or longitudinal offset. In the second position P2, the table 102 is still in the substantially horizontal orientation and items can still be placed thereon.

The table 102 is deployable automatically, i.e., without user intervention, to move between the first position P1 and the second position P2. An actuation system 104 for deploying the table 102 to the second position P2 is shown in later-described FIG. 8.

In FIG. 3, the deployable leaves 146, 148 are still in the closed configuration. The table 102 is still facing the x-axis and has not been turned. This is to prevent interference between the table 102 and seat backs of front seats 5 of the vehicle 1. Further, interlocks (not shown) can be provided within the table 102 to require the table 102 to be slid rearwards from the second position P2 to an aft position AP before the deployable leaves 146, 148 can be moved to their open configuration and/or before the table 102 can be turned to the first operating angle A1 or to the second operating angle A2.

The movable apparatus comprises a support 110 coupling the table 102 to the stowage portion 114. FIG. 3 illustrates a support 110 beneath the table 102, through which a load path from the table 102 towards the vehicle body is transferred. The support 110 can comprise one or more struts (arms). The table 102 may be cantilevered in an aft direction from the support 110.

The illustrated support 110 couples the table 102 to a lower portion 112 of the table system 100. The lower portion 112 of the table system 100 provides another function for occupants of the seats 4 of the vehicle 1. When the table 102 is elevated to the second position P2, the lower portion 112 is revealed for user-access.

In some examples, the lower portion 112 comprises a stowage portion 114 used for storing items. The illustrated stowage portion is a stowage platform. It would be appreciated that different forms of stowage portion could be provided in other examples. The stowage portion 114 may be concealed beneath the table 102 and within the vehicle centre console 2 when the movable apparatus is in the first position P1. The stowage portion 114 may be elevated and revealed for user-access when the movable apparatus is elevated to the second position P2.

The lower portion 112, the support 110 and the table 102 may form a movable apparatus, movable together as one unit/body or movable separately. In the illustrated example, the lower portion 112, the support 110 and the table 102 are fixed together as a single double-ticred body. The actuation system 104 is configured to elevate the table from the first position P1 to the second position P2. The actuation system 104 moves the single body comprising the lower portion 112, the support 110 and the table 102, rather than moving the table 102 separately. Therefore, the lower portion 112 rises with the table 102, to become visible to occupants of the seats 4 of the vehicle 1. Occupants can then easily reach under the elevated table 102 to place/retrieve items on the lower portion 112.

The lower portion 112 therefore represents a secure stowage area because it is well concealed from the cabin C of the vehicle 1. When the table 102 is in the first position P1, the lower portion 112 is concealed within the vehicle centre console 2 and beneath the table 102. The lower portion 112 may be fully enclosed and user-inaccessible so that it cannot be reached by hand, and is concealed so that it cannot be seen from the cabin C. Another reason that the lower portion 112 is secure is because it is only accessible when the actuation system 104 is powered on to elevate the table 102. Power to the actuation system 104 is protected by other security features of the vehicle 1, related to an ignition system.

The stowage portion 114 may comprise or consist of a stowage platform 114. At least part of the stowage platform 114 of the lower portion 112 may be a recessed base surface below upper edges 115 (perimeter edges) of the lower portion 112. The recessed base surface may comprise a plan area of greater than 150 centimetres squared or greater than 300 centimetres squared. The average recess depth (height of side walls 113) may be greater than two centimetres, for example. This helps to retain items within the lower portion 112 and prevent them from becoming dislodged. This also provides additional vertical clearance beneath the underside of the table 102, such as a fixed/minimum vertical separation of more than ten centimetres. The upper edges 115 of the lower portion 112 may be connected to the recessed stowage platform 114 of the lower portion 112 via one or more side walls 113. This helps to keep items within the plan view envelope of the lower portion 112, to prevent them from protruding laterally and getting caught between the lower portion 112 and the vehicle centre console 2. In an alternative example, the lower portion 112 is not recessed relative to the upper edges 115.

In FIG. 3, when the table 102 is at the second position P2, the upper edges 115 of the lower portion 112 may be at the flush position FP on the first plane P. Therefore, the perimeter (upper edges 115) of the lower portion 112 appears flush with the rest of the vehicle centre console 2. The area and dimensions of the lower portion 112 may be substantially the same as that of the table 102, so that the upper edges 115 of the lower portion 112 meet the corresponding upper peripheral edges 2A of the vehicle centre console 2 with minimal gaps therebetween.

Figure 8:
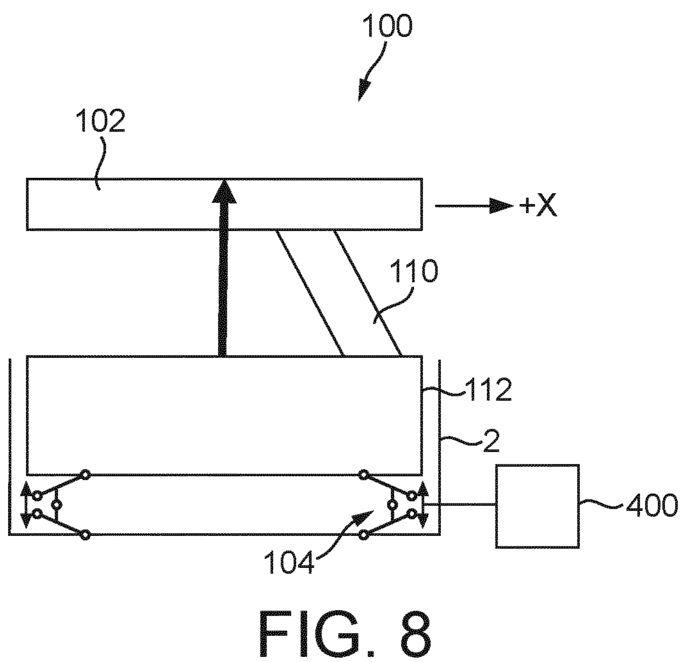
FIG. 8 schematically illustrates an example of an actuation system.

Components of the actuation system 104, shown in FIG. 8, may be hidden beneath the lower portion 112. The actuation system 104 may be configured to lift the lower portion 112 from below. This elevates the lower portion 112 along with the table 102 and the support 110.

FIG. 8 schematically illustrates an example implementation of the actuation system 104. The actuation system 104 comprises one or more actuators and a mechanism. The mechanism can comprise a scissor lift mechanism. Vertical guiderails may be located adjacent each corner of the lower portion 112, to guide the lifting and lowering of the lower portion 112. The actuation system 104 is controlled by an electrical signal from a control system 400.

In an alternative example, separate actuators and/or separate mechanisms are provided for moving the lower portion 112 and for moving the table 102.

Referring back to FIG. 3, the support 110 may be a fixed-length support, to provide greater rigidity than a variable-length support. The upper edge 115 of the lower portion 112 and the table 102 may have a fixed vertical separation therebetween. The fixed vertical separation may be the same value as the previously defined vertical distance between the first position P1 and the second position P2.

The lower portion 112 and the table 102 may be fixed in the substantially horizontal orientation. The support 110 may be configured to inhibit rotation of the table 102 away from the substantially horizontal orientation. The support 110 may be fixed-ended at both ends, enabling transmission of bending forces through the connections at its base 116 and top 117. The fixed-ended connections may prevent rotation of the table 102 about the x-axis and about the y-axis. This provides greater rigidity than systems that enable rotation of the table 102 about multiple axes.

The support 110 may comprise one or more hollow structural sections, for rigidity. The support 110 may comprise a material with a high Youngs Modulus such as a metal. The metal may comprise aluminium or an equivalent thereof. The section may have a cross-sectional shape configured to resist deflection in different axes. For example, the section or sections may have a second moment of area in a first axis that is greater than half of its second moment of area in a second axis.

The use of a hollow structural section also enables electrical wiring for any electrical components in the table 102 to be hidden within the hollow interior of the support 110.

In order to prevent obstruction of the stowage platform 114, the base 116 of the support 110 in FIG. 3 is located towards a fore end of the table system 100, fore of the stowage platform 114. The support 110 may be inclined (angled) rearward, so that the top 117 of the support 110 is located aft of a fore edge 145 of the table 102, towards a centre of the table 102, and is located aft of the base 116 of the support 110. Since the top 117 of the support 110 is towards the centre of the table 102, there is space for a slider 106 (FIG. 9) to enable the table 102 to slide aft relative to the support 110. The length of the slider 106 depends on the x-axis distance from the top 117 of the support 110 to the fore edge 145 of the table 102.

Figure 9:
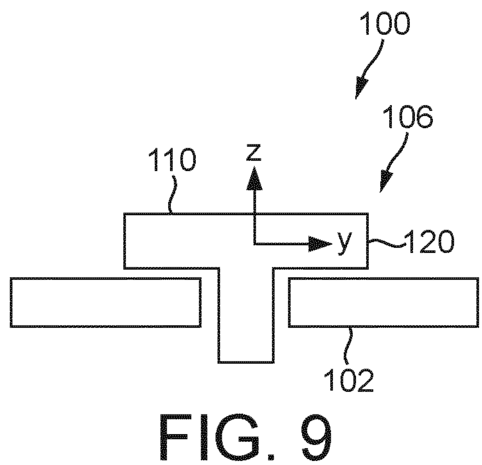
FIG. 9 schematically illustrates an example of a slider.

FIG. 9 schematically illustrates a cross-section of an example slider 106. The slider 106 may enable manual sliding, by hand, of the table 102 relative to the support 110. The slider 106 may comprise a prismatic joint or similar, formed by a longitudinal guide slot 132 and at least a first protrusion 120.

Figure 4:
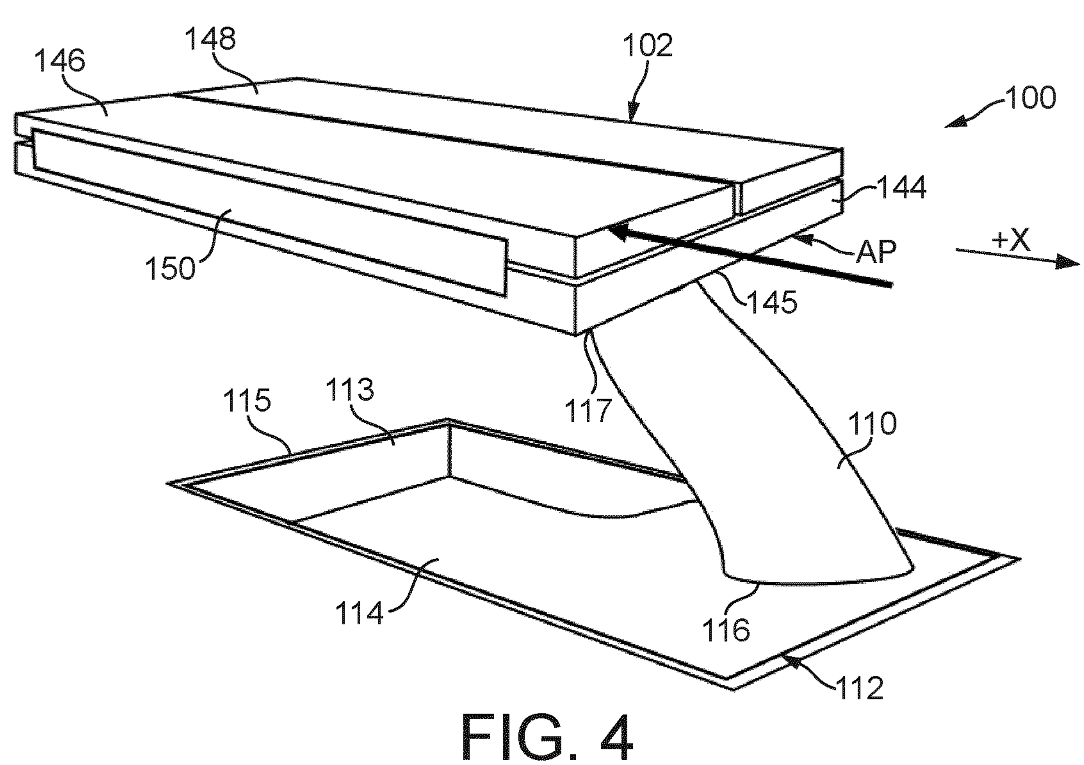
FIG. 4 illustrates an example in which the table has been moved to an aft position.
Figure 5:
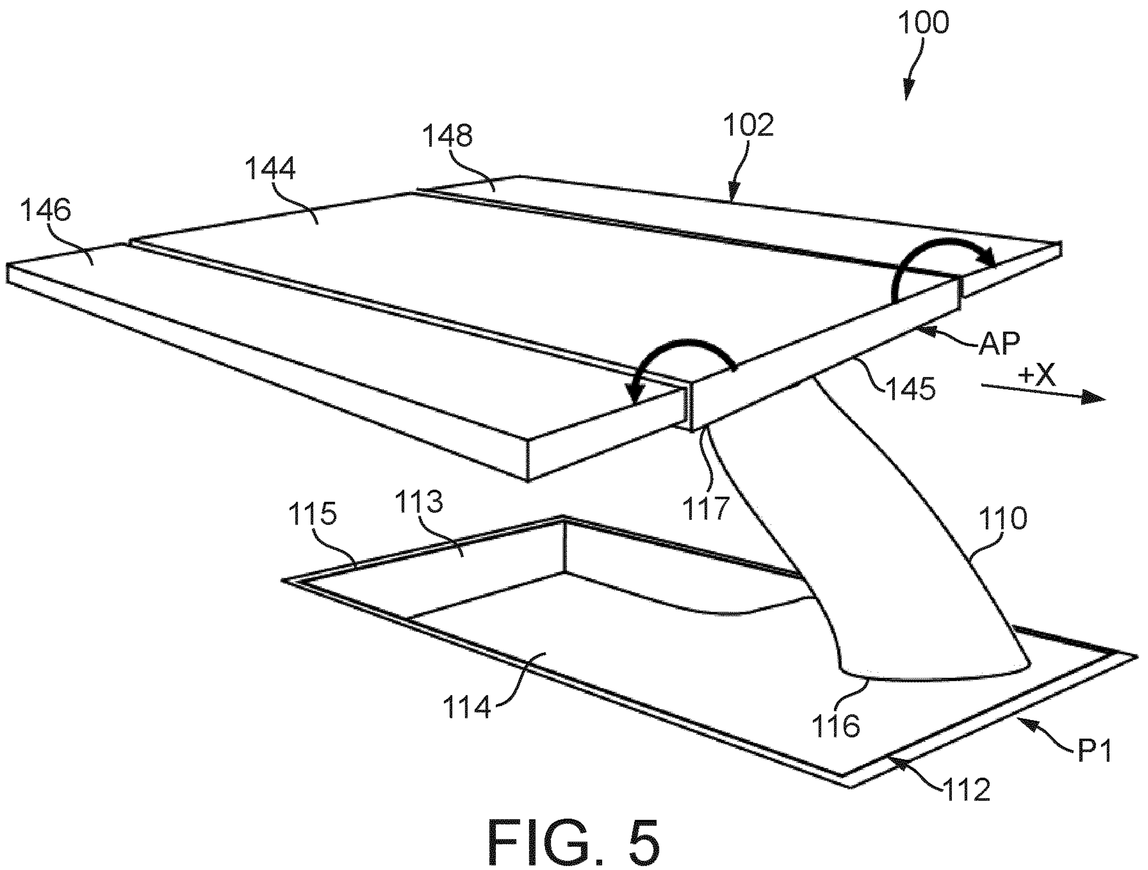
FIG. 5 illustrates an example in which deployable leaves of the table have been deployed.

The slider 106 is configured to enable horizontal sliding of the table from the second position P2 to an aft position AP. FIG. 4 illustrates the table 102 at the aft position AP rearward of the second position P2, having been slid rearward using the slider 106. The aft position AP may be a position at which the slider 106 has reached a limit of travel.

Figure 6:
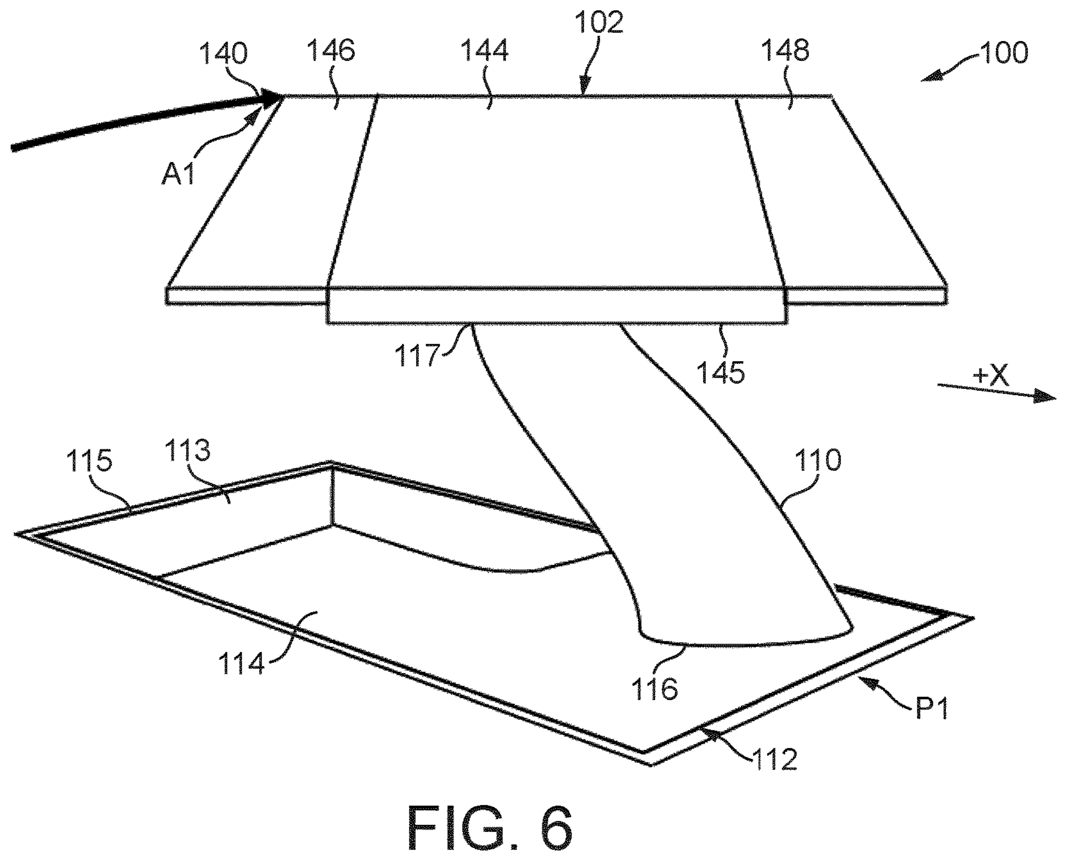
FIG. 6 illustrates an example in which the table has been turned to a first operating angle.
Figure 7:
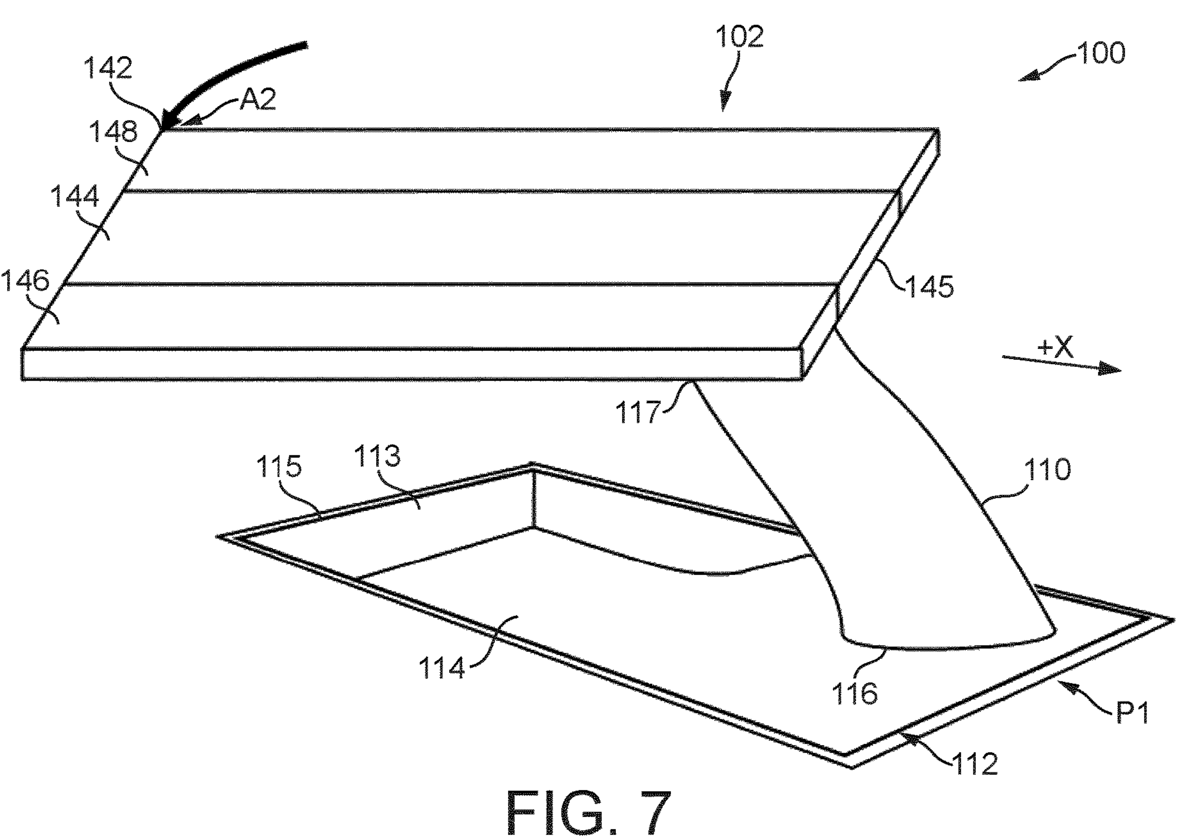
FIG. 7 illustrates an example in which the table has been turned to a second operating angle.

The aft position AP may be at substantially the same height as the second position P2. The aft position AP may be in the substantially horizontal orientation. The table 102 is aft of the lower portion 112. At least part of the table 102 at the aft position AP may now be above the cupholder system 200 and/or the user input device 302. The table 102 at the aft position AP is clear of the seat backs of the front seats 5, so the hinged deployable leaves 146, 148 can now be rotated to the open configuration (FIG. 5) and/or the table 102 can now be turned relative to the z-axis to face left or right (FIGS. 6, 7).

The sliding of the table 102 relative to the top 117 of the support 110 means that the top 117 of the support 110 is now closer to the fore edge 145 of the table 102. Therefore, the cantilevered span of the table 102 is greater. The use of a strong, rigid support 110 as described above helps to damp vibration of the table 102 associated with the longer cantilevered span.

Figure 10:
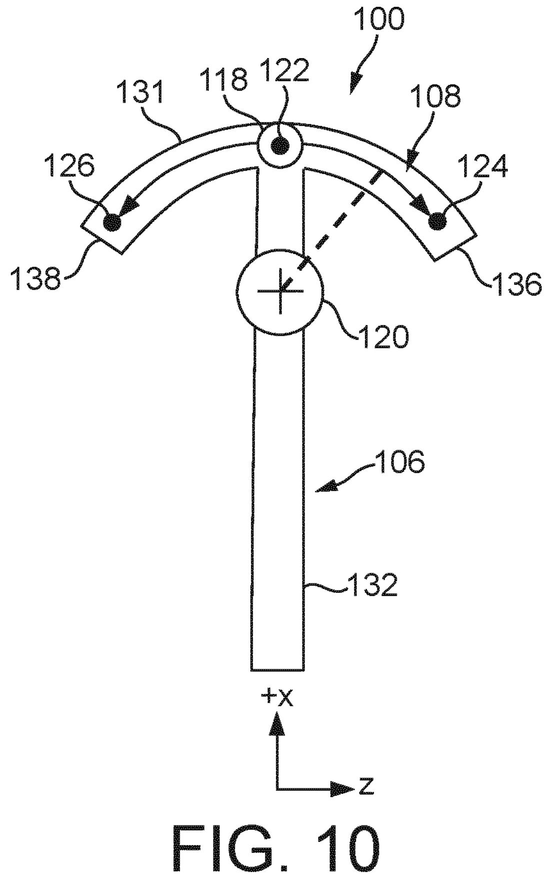
FIG. 10 schematically illustrates an example of the slider and a pivot.

FIG. 10 schematically illustrates a plan view of the example slider 106. The example slider 106 comprises a longitudinal guide slot 132 within which one or more protrusions 118, 120 is/are constrained. If the table 102 is fore of the aft position AP, the slider 106 comprises one degree of freedom of translation to enable sliding in the x-direction between the second position P2 and the aft position AP. If the table 102 is at the aft position AP, a pivot 108 may provide an extra degree of freedom to enable the turning of the table 102. The pivot 108 may be disposed proximal to a fore end of the table 102. The pivot 108 may be configured to enable turning of the table 102 along a horizontal arc, in a clockwise direction and/or an anti-clockwise direction.

In the illustrated example, the table 102 comprises the longitudinal guide slot 132 and the support 110 comprises the first protrusion 120. Therefore, as the table 102 is moved, the longitudinal guide slot 132 moves relative to the static first protrusion 120. In another implementation, the support 110 comprises the longitudinal guide slot 132 and the table 102 comprises the first protrusion 120, so that the first protrusion 120 moves within the static longitudinal guide slot 132.

The slider 106 may comprise a detent 122 configured to engage when the table 102 reaches the aft position AP. The detent 122 further increases the stability of the table 102, for example by resisting unintended sliding and/or turning out of the aft position AP. FIG. 10 illustrates an example location of the detent 122. The detent 122 may comprise a biased plug and a socket. The plug may be a rounded article such as a ball. The bias may comprise a spring. The socket may comprise a blind hole into which the plug is biased. The rounded shape of the plug enables the detent 122 to be disengaged by horizontal force even though bias force is applied in a vertical direction.

In one implementation, the support 110 comprises the plug and the underside of the table body 144 comprises the socket. In another implementation, the underside of the table body 144 comprises the plug and the support 110 comprises the socket.

FIG. 10 also illustrates an example implementation of a pivot 108 configured to enable turning of the table 102 along a horizontal arc, in clockwise and anti-clockwise directions, between the first operating angle A1 (facing a left seat 4, FIG. 6) and a second operating angle A2 (facing a right seat 4, FIG. 7). The pivot 108 may enable manual turning of the table 102 by hand.

The first protrusion 120 may be part of a rotatable joint, rotatable about a vertical axis (z-axis). In order to limit the amount of rotation so that the table 102 (with its deployable leaves 146, 148 in the open configuration) does not collide with the front seats 5, the table system 100 may comprise rotation detents 124, 126 and/or a rotation limiter, both of which are illustrated in FIG. 10.

The angular separation between the first operating angle A1 (first rotation detent 124) and the aft position AP may be a value less than 70 degrees, such as approximately 30 degrees. The angular separation between the second operating angle A2 (second rotation detent 126) and the aft position AP may be a value less than 70 degrees, such as approximately 30 degrees. In a non-limiting implementation, the table 102 can be turned by +30 degrees.

The rotation limiter of FIG. 10 comprises a curved guide slot 131 in the same plane as and mounted to the same body as the longitudinal guide slot 132. FIG. 10 illustrates a single T-slot comprising the longitudinal guide slot 132 and the curved guide slot 131 which meet at an intersection.

The curved guide slot 131 is configured to constrain a second protrusion 118. The second protrusion 118 is mounted to the same body as the first protrusion 120. The second protrusion 118 is separated from the first protrusion 120 in the x-direction by a distance corresponding to a radius which is the same as the radius of curvature of the curved guide slot 131. When the table 102 is at the aft position AP, the first protrusion 120 intersects the centre of curvature of the curved guide slot 131 and the second protrusion 118 enters/engages with the curved guide slot 131. This 'unlocks' the extra degree of freedom to turn/rotate the table 102 clockwise or anti-clockwise about the first protrusion 120. When the table 102 is turned about the first protrusion 120, the curved guide slot 131 slides relative to the second protrusion 118. Each end region 136, 138 of the curved guide slot 131 defines a limit of rotation of the second protrusion 118 and therefore a limit of rotation of the table 102.

FIG. 10 further illustrates rotation detents 124, 126 for holding the table 102 at the limit of rotation. The pivot 108 may comprise a first detent 124 of the rotation detents 124, 126, corresponding to a first end 136 of the arc and corresponding to the first operating angle A1 of the table 102. The pivot 108 may comprise a second detent 126 of the rotation detents 124, 126, corresponding to a second opposite end 138 of the arc and corresponding to the second operating angle A2 of the table 102.

The rotation detents 124, 126 may comprise sockets to either side of the socket of the aft position detent 122. When the table 102 is turned, the biased plug may disengage from the aft position detent 122 and can then engage with either one of the rotation detents 124, 126. The biased plug may be mounted to the second protrusion 118. In an alternative example, detents 122, 124, 126 could be implemented using separate plugs rather than separate sockets.

FIG. 12 schematically illustrates an example of a control system 400, sensors, actuators and user input devices. The control system 400 comprises one or more controllers. The controller may comprise at least one processor, and at least one memory including computer program code, the at least one processor with the at least one memory and the computer program code configured to perform one or more of the functions described herein.

The electrical signal for moving the table 102 between the first position P1 and the second position P2 may be initiated in dependence on detection of a user input provided to the user input device 302. The user input device 302 may provide a user input control for operating the table system 100, for initiating the electrical signal. Upon user actuation of the user input control, the table system 100 may actuate automatically, i.e., without user intervention.

In some examples, an electrical signal in response to a first user input causes the actuation system 104 to move the table 102 from the first position P1 to the elevated second position P2. A second electrical signal in response to a second user input causes the actuation system 104 to move the table 102 from the second position P2 to the first position P1. The second electrical signal may be in response to a user input of a different user input control for 'deactivating' (lowering, stowing) the table system 100.

The control system 400 may be configured to, during lowering and/or raising of the table 102 between the second position P2 and the first position P1, detect an interference against moving the table 102 to the first position P1, and to interrupt the lowering of the table 102 in response to the detection. The interference may comprise, for example, an object trapped between the table 102 and an upper peripheral edge 2A of the vehicle centre console 2. Detecting the interference may comprise, for example, detecting a load on the actuator, such as electrical current. If the load increases above a threshold, it implies that the movement is blocked.

Further, the table 102 may comprise a sensor for detecting whether the table 102 is in a condition to be lowered from the second position P2 to the first position P1. The control system 400 is configured to control whether to enable the table 102 to lower from the second position P2 to the first position P1, in dependence on information from the sensor.

The sensor may comprise a slider sensor 128 for indicating a state of the slider 106. The table 102 may comprise the slider sensor 128. The slider sensor 128 may be configured to detect whether the table 102 is at the second position P2. If the slider sensor 128 detects that the table 102 is at the second position P2, its output signal indicates to the control system 400 that the table 102 can be lowered. If the table 102 is away from the second position P2, the retraction (lowering) of the table 102 is not enabled.

The table 102 also cannot be retracted if it has been turned and/or if its deployable leaves 146, 148 are in the open configuration. This avoids undesired contact between the table 102, during retraction, and the trim atop the sides of the vehicle centre console 2. Physical interlocks prevent this from happening, without the need for further sensors. The design of the curved guide slot 131 of FIG. 10 ensures that the table 102 cannot be slid forwards from the aft position AP in a turned state. The table 102 is only slidable when no longer turned. A similar interlock (not shown) for the double hinge 150 ensures that the table 102 is only slidable when the deployable leaves 146, 148 have been moved to the closed configuration. An example hinge interlock comprises a hinge block portion movable between interference and non-interference positions by a mechanism attached to the slider 106. Therefore, when the slider sensor 128 indicates that the table 102 is at the second position P2, it is guaranteed that the table 102 is not in a turned state and that the deployable leaves 146, 148 are in the closed configuration. In alternative examples in which such interlocks do not exist, then further sensors could be implemented such as a pivot sensor and/or a hinge sensor.

In some implementations, the front seats 5 can potentially be slid and/or tilted backwards far enough that the table 102 may be collided with, if the table 102 is turned to its first or second operating angle A1, A2 with its deployable leaves 146, 148 in the open configuration. In order to prevent such interference without compromising the design of the table 102, the control system 400 may be configured to control a rearward adjustment limit of the front seat 5, based on a sensor of the table 102. The rearward adjustment limit may be applied to a power seat system 158 of the front seat 5 to set an aft end of travel in response to actuation of a power seat user input device 156. The rearward adjustment limit may comprise a rearward seat sliding limit and/or a rearward backrest tilting limit.

The sensor may comprise a pivot sensor 130 configured to indicate whether the table 102 is in a turned state. The table 102 is in a turned state when it has been turned away from the aft position AP and/or when it has reached the first or second operating angle A1, A2.

The control system 400 may be configured to reduce the rearward sliding limit when the pivot sensor 130 indicates that the table 102 is in a turned state, but not when the pivot sensor 130 indicates that the table 102 is not in a turned state (e.g., at the aft position AP or second position P2). If the table 102 is returned to the aft position AP from the turned state, the rearward sliding limit may be increased back to its default value.

In addition to, or instead of a pivot sensor 130, a hinge sensor (not shown) may optionally be used to indicate whether the deployable leaves 146, 148 are unfolded.

The table system 100 may further comprise a lighting system (not shown) that is configured to illuminate the lower portion 112 when the table 102 is at the second position P2. The lighting system may be mounted to the underside of the table 102 and/or to the support 110.

The electrical lines for the sensors and/or lighting system may extend through the hollow cross-section of the support 110, to the table 102.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

Although embodiments of the present invention have been described in the preceding paragraphs with reference to various examples, it should be appreciated that modifications to the examples given can be made without departing from the scope of the invention as claimed. For example, the slider 106 and/or the pivot 108 and/or the deployable leaves 146, 148 may be powered by actuators, for further automation.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A vehicle centre console table system for a vehicle, the vehicle centre console table system comprising:
- a table;
- an actuation system configured to, in dependence on an electrical signal, elevate the table from a first position to a second position above the first position, wherein in the first position the table is in a substantially horizontal orientation and defines a vehicle centre console surface, and wherein in the elevated second position the table is in the substantially horizontal orientation;
- a slider configured to enable horizontal sliding of the table from the second position to an aft position rearward of the second position;
- a pivot proximal to a fore end of the table, configured to enable turning of the table along a horizontal arc, in clockwise and anti-clockwise directions, between a first operating angle to a first side (−y) of the aft position and a second operating angle to a second opposite side (+y) of the aft position; and
- a support coupling the table to a lower portion, wherein the actuation system is configured to elevate the combination of the lower portion and the table, wherein the lower portion comprises a stowage portion, wherein the stowage portion is concealed from a cabin of the vehicle when the table is in the first position, wherein the stowage portion is a stowage platform, wherein the table at the first position is at a flush position relative to a first plane of a table system opening of a vehicle centre console and the stowage platform is enclosed beneath the table, and wherein when the table is at the second position an upper edge of the stowage platform is substantially at the flush position.

2. A vehicle centre console table system for a vehicle, the vehicle centre console table system comprising:
- a table;
- an actuation system configured to, in dependence on an electrical signal, elevate the table from a first position to a second position above the first position, wherein in the first position the table is in a substantially horizontal orientation and defines a vehicle centre console surface, and wherein in the elevated second position the table is in the substantially horizontal orientation;
- a slider configured to enable horizontal sliding of the table from the second position to an aft position rearward of the second position;
- a pivot proximal to a fore end of the table, configured to enable turning of the table along a horizontal arc, in clockwise and anti-clockwise directions, between a first operating angle to a first side (−y) of the aft position and a second operating angle to a second opposite side (+y) of the aft position; and
- a support coupling the table to a lower portion, wherein the actuation system is configured to elevate the combination of the lower portion and the table, wherein the lower portion comprises a stowage portion, wherein the stowage portion is concealed from a cabin of the vehicle when the table is in the first position, wherein a base of the support is located fore of the stowage portion, and wherein the support is angled in an aft direction towards the table.

3. A vehicle centre console table system for a vehicle, the vehicle centre console table system comprising:
- a table;
- an actuation system configured to, in dependence on an electrical signal, elevate the table from a first position to a second position above the first position, wherein in the first position the table is in a substantially horizontal orientation and defines a vehicle centre console surface, and wherein in the elevated second position the table is in the substantially horizontal orientation;
- a slider configured to enable horizontal sliding of the table from the second position to an aft position rearward of the second position; and
- a pivot proximal to a fore end of the table, configured to enable turning of the table along a horizontal arc, in clockwise and anti-clockwise directions, between a first operating angle to a first side (−y) of the aft position and a second operating angle to a second opposite side (+y) of the aft position, the vehicle centre console table system comprising one or more of:

a pivot sensor configured to indicate a state of the pivot; and a control system configured to control the actuation system in dependence on the electrical signal.

4. The vehicle centre console table system of claim 3, comprising a support coupling the table to a lower portion, wherein the actuation system is configured to elevate the combination of the lower portion and the table.

5. The vehicle centre console table system of claim 4, wherein the support is configured to inhibit rotation of the table away from the substantially horizontal orientation.

6. The vehicle centre console table system of claim 4, wherein the lower portion comprises a stowage portion, wherein the stowage portion is concealed from a cabin of the vehicle when the table is in the first position.

7. The vehicle centre console table system of claim 4, wherein the support is a fixed-length support.

8. The vehicle centre console table system of claim 3, wherein the slider comprises a detent at the aft position and/or a slider sensor configured to indicate a state of the slider.

9. The vehicle centre console table system of claim 3, wherein the aft position is a central position along the horizontal arc, such that the table can be turned via the pivot to either side of a longitudinal axis to face different seats in a row of seats.

10. The vehicle centre console table system of claim 3, wherein an angular separation between the first operating angle and the aft position is a value less than 70 degrees, and wherein an angular separation between the second operating angle and the aft position is a value less than 70 degrees.

11. The vehicle centre console table system of claim 3, wherein the pivot comprises a first detent corresponding to the first operating angle of the table and wherein the pivot comprises a second detent corresponding to the second operating angle of the table.

12. The vehicle centre console table system of claim 3, wherein the table comprises deployable leaves configured to, when deployed, increase a surface area of the table.

13. The vehicle centre console table system of claim 3, wherein the table comprises deployable leaves configures to, when deployed increase a surface area of the table, and wherein the control system is configured to control a rearward adjustment limit of a seat of the vehicle, the seat located fore of the vehicle centre console table system, in dependence on information from the pivot sensor, wherein the rearward adjustment limit is reduced if the pivot sensor indicates that the table is in a turned state.

14. A vehicle centre console comprising the vehicle centre console table system of claim 3.

15. A vehicle comprising the vehicle centre console of claim 14.

16. A vehicle centre console table system for a vehicle, the vehicle centre console table system comprising:

a table;

an actuation system configured to, in dependence on an electrical signal, elevate the table from a first position to a second position above the first position, wherein in the first position the table is in a substantially horizontal orientation and defines a vehicle centre console surface, and wherein in the elevated second position the table is in the substantially horizontal orientation;

a slider configured to enable horizontal sliding of the table from the second position to an aft position rearward of the second position, wherein the slider comprises a detent at the aft position and/or a slider sensor configured to indicate a state of the slider; and a pivot proximal to a fore end of the table, configured to enable turning of the table along a horizontal arc, in clockwise and anti-clockwise directions, between a first operating angle to a first side (−y) of the aft position and a second operating angle to a second opposite side (+y) of the aft position, wherein the table comprises deployable leaves configured to, when deployed, increase a surface area of the table and wherein a control system is configured to, during lowering of the table from the second position to the first position, detect an interference against moving the table to the first position, and to interrupt the lowering of the table in response to the detection, and/or wherein the control system is configured to control whether to enable the table to lower from the second position to the first position, in dependence on information from the slider sensor, so that retraction is not enabled if the table is away from the second position.

* * * * *